US010877127B2

(12) United States Patent
Fortney

(10) Patent No.: US 10,877,127 B2
(45) Date of Patent: Dec. 29, 2020

(54) SYSTEM AND METHOD FOR DISMOUNTED ASSURED POSITION, NAVIGATION AND TIMING (DAPNT)

(71) Applicant: Science Applications International Corporation, Reston, VA (US)

(72) Inventor: George Fortney, Toms River, NJ (US)

(73) Assignee: Science Applications International Corporation, Reston, VA (US)

( * ) Notice: Subject to any disclaimer, the term of this patent is extended or adjusted under 35 U.S.C. 154(b) by 151 days.

(21) Appl. No.: 16/267,191

(22) Filed: Feb. 4, 2019

(65) Prior Publication Data
US 2020/0096600 A1 Mar. 26, 2020

Related U.S. Application Data

(63) Continuation of application No. 16/140,040, filed on Sep. 24, 2018, now Pat. No. 10,234,538.

(51) Int. Cl.
*G01S 5/02* (2010.01)
*G01S 5/14* (2006.01)
(Continued)

(52) U.S. Cl.
CPC ............ *G01S 5/0289* (2013.01); *G01S 19/47* (2013.01); *H04L 63/0428* (2013.01);
(Continued)

(58) Field of Classification Search
CPC .......... G01S 5/0289; G01S 19/47; G01S 5/14; G01S 5/02; G01S 19/48; G01S 5/0072;
(Continued)

(56) References Cited

U.S. PATENT DOCUMENTS 6,671,622 B2   12/2003   McCall et al. ................ 701/220
7,292,186 B2   11/2007   Miller et al. ............. 342/357.15
(Continued)

FOREIGN PATENT DOCUMENTS

CN        104931993       9/2015     ............ G01S 19/03

OTHER PUBLICATIONS

Orolia, "VersaPNT—Assured Position, Navigation, and Timing in a Single Solution," www.orolia.com, Aug. 17, 2018, 4 pp.
(Continued)

*Primary Examiner* — Jaime Figueroa
(74) *Attorney, Agent, or Firm* — Dawn-Marie Bey; Bey & Cotropia PLLC

(57) ABSTRACT

A process described herein may be used to determine a first asset's position in a GNSS-limited environment. The process includes transmitting a current position for each of at least three additional assets in wireless messages by wireless transmitters. The current position for each of the at least three additional assets is determined using previously received position data and one more additional measurement generated by instruments on board the additional assets. The transmitted messages are received at a device of the first asset and a processor on the device implements pre-programmed instructions to access the current position for each of the three additional assets and determine the first asset's position using the current position for each of the three additional assets.

21 Claims, 4 Drawing Sheets

(51) Int. Cl.
| | |
|---|---|
| *H04L 29/06* | (2006.01) |
| *G01S 19/47* | (2010.01) |
| *H04W 4/02* | (2018.01) |
| *H04W 12/02* | (2009.01) |
| *H04W 84/12* | (2009.01) |

(52) U.S. Cl.
CPC ......... *H04L 63/0435* (2013.01); *H04W 4/025* (2013.01); *H04W 12/02* (2013.01); *H04L 63/302* (2013.01); *H04W 84/12* (2013.01)

(58) Field of Classification Search
CPC ..... H04W 4/025; H04W 12/02; H04W 84/12; H04L 63/0428; H04L 63/0435; H04L 63/302
USPC ...................................................... 701/1, 470
See application file for complete search history.

(56) References Cited

U.S. PATENT DOCUMENTS

| | | | | |
|---|---|---|---|---|
| 7,409,290 | B2 | 8/2008 | Lin | 701/214 |
| 8,626,189 | B2 | 1/2014 | Silny et al. | 455/456.1 |
| 8,862,394 | B2 | 10/2014 | Taylor, Jr. et al. | 701/470 |
| 9,014,162 | B2 | 4/2015 | Brundage et al. | H04W 64/003 |
| 9,173,065 | B2 * | 10/2015 | Smith | G01S 19/13 |
| 9,529,089 | B1 * | 12/2016 | Buether | G01S 19/05 |
| 9,763,051 | B2 * | 9/2017 | Belghoul | H04W 4/025 |
| 10,168,167 | B2 * | 1/2019 | Rakah | G01C 21/3438 |
| 10,736,062 | B2 * | 8/2020 | Malekpour | H04W 56/001 |
| 2004/0230374 | A1 | 11/2004 | Tzamaloukas | 701/217 |
| 2008/0077326 | A1 | 3/2008 | Funk et al. | 701/220 |
| 2008/0177436 | A1 | 7/2008 | Fortson | 701/29 |
| 2009/0027229 | A1 | 1/2009 | Fortson et al. | 340/870.07 |
| 2009/0213828 | A1 * | 8/2009 | Brundage | G01S 5/0289 370/338 |
| 2009/0322510 | A1 | 12/2009 | Berger et al. | 340/539.1 |
| 2011/0068906 | A1 * | 3/2011 | Shafer | G06K 7/0008 340/10.3 |
| 2011/0288728 | A1 | 11/2011 | Ruizenaar | 701/41 |
| 2011/0313663 | A1 | 12/2011 | Kellum et al. | 701/300 |
| 2013/0143591 | A1 | 6/2013 | Silny et al. | 455/456.1 |
| 2013/0158867 | A1 | 6/2013 | Sidhu et al. | 701/472 |
| 2014/0149032 | A1 | 5/2014 | Barrett et al. | 701/409 |
| 2014/0207374 | A1 | 7/2014 | Taylor, Jr. et al. | 701/470 |
| 2014/0306834 | A1 | 10/2014 | Ricci | 340/902 |
| 2015/0048972 | A1 | 2/2015 | Kennedy et al. | 342/357.29 |
| 2015/0276783 | A1 | 10/2015 | Palella et al. | G01P 1/006 |
| 2016/0014713 | A1 | 1/2016 | Kennedy et al. | 455/456.1 |
| 2016/0196750 | A1 | 7/2016 | Collins | 701/14 |
| 2016/0313450 | A1 | 10/2016 | Jordan et al. | G01S 19/40 |
| 2017/0357009 | A1 | 12/2017 | Raab et al. | |

OTHER PUBLICATIONS

Cisco, Technical White Paper, "802.11ac: The Fifth Generation of Wi-Fi," Copyright 2018, 20 pp.

"Positioning, Navigation and Timing, Solicitation No. W56KGU-18-R-PN22, Department of the Army, Army Contracting Command" [online], Nov. 2017 [retrieved on Jul. 26, 2018], 17 pp., Retrieved from the Internet: https://www.fbo.gov/?s=opportunity&mode=form&id=d96b0280aba88d75a0ee576307885345&tab=core&tabmode=list&print_preview=1.

"Request for Information (RFI) For: Assured Positioning, Navigation, and Timing, Solicitation No. W56KGY-16-R-APNT, Department of Army, Army Contracting Command" [online], Apr. 2016 [retrieved on Jul. 26, 2018], 7 pp., Retrieved from the Internet: https://www.fbo.gov/index?s=opportunity&mode=form&id=a1bf08d0e477c5e231319e3669ddab4e&tab=core&tabmode=list&print_preview=1.

SBIR—STTR, "Dismounted Soldier Positioning, Navigation and Timing (PNT) System Initialization" [online], Nov. 30, 2016 [retrieved on Jul. 26, 2018], 2 pp., Retrieved From the Internet: https://sbir.gov/print/sbirsearch/detail/1208005.

Sydney J. Freedberg, Jr., "Speedier Software Upgrades for Army Vehicles: Open Architecture" [online], Acquisition, Intel & Cyber, Land, Oct. 23, 2017 [retrieved on Jul. 9, 2018], 4 pp., Retrieved from the Internet: https://breakingdefense.com/2017/10/speedier-software-upgrades-for-army-vehicles-open-architecture/.

Kym Gilhooly, "Defense Department Moves to Augment GPS With Alternatives" [online], FedTech, [retrieved on Jul. 6, 2018], 7 pp., Retrieved from the Internet: https://fedtechmagazine.com/article/2018/05/defense-department-moves-augment-gps-alternatives.

Scott Welles and William Nichols, Booz Allen Hamilton, Inc., "Resilient Positioning, Navigation and Timing (PNT) Requires New Thinking About Systems Integration," Copyright 2017, 8 pp.

Dr. Raymond Filler, Mr. Steven Ganop, Mr. Paul Olson, Dr. Stanley Sokolowski, U.S. Army Command and Control Directorate (C2D), Major William Fischer, Project Manager for Navigation Systems, "Positioning, Navigation and Timing: The Foundation of Command and Control," 30 pp., Jun. 2004.

Curtiss-Wright Defense Solutions Press Releases, "Curtiss-Wright Spotlights COTS-Based Victory Services and Mounted A-PNT Solutions at GVSETS 2018" [online], Aug. 10, 2018 [retrieved on Aug. 29, 2018], 14 pp., Retrieved from the Internet: https://www.army-technology.com/contractors/electronic/curtiss/pressreleases/curtiss-wright-spotlights-cots-based-victory-services-mounted-pnt-solutions-gvsets-2018/.

Connie Lee, "Special Operators Pursuing New Position, Navigation and Timing Capabilities," National Defense, 5 pp., May 17, 2018.

A. Gunther, et al., "Measuring Round Trip Times to Determine the Distance Between WLAN Nodes," In Proc. of Networking 2005, Waterloo, Canada, May 2005.

F. Viani, et al., "Object Tracking Through RSSI Measurements in Wireless Sensor Networks," Technical Report # DISI-11-005, University of Trento Dipartimento Di Ingegneria E Scienza Dell'informazione, May 2008.

Sergio Elias Hernandez, et al., "Distance and Cable Length Measurement System," MDPI Sensor Journal, pp. 10190-10200, doi:10.3390/s91210190, Oct. 2009.

International Search Report and Written Opinion for Application No. PCT/US18/52498, dated Dec. 4, 2018 (10 pp.).

Smith, Elizabeth, "Radio Frequency Signal Propagation Study," 2014, Cyber and Electronic Warfare Division, DSTO Defence Science and Technology Organisation, Australia, pp. 1-37 (2014).

Steven D. Keller, Anti-Jam GPS Antennas for Wearable Dismounted Soldier Navigation Systems, ARL U.S. Army Research Laboratory, ARL-TR-7670, pp. 1-30, 2016.

Kenneth A. Fisher, et al., "Precision Position, Navigation, and Timing Without the Global Positioning System," Air and Space Power Journal, pp. 24-33, Summer 2011.

Emily K. Hebeler, et al., "The Application of Human-Systems Integration: Designing the Next Generation of Military Global Positioning System Handheld Devices," Johns Hopkins APL Technical Digest, vol. 31, No. 1, pp. 66-75, 2012.

* cited by examiner

SYSTEM AND METHOD FOR DISMOUNTED ASSURED POSITION, NAVIGATION AND TIMING (DAPNT)

CROSS-REFERENCE TO RELATED APPLICATIONS

The present application is a continuation of U.S. patent application Ser. No. 16/140,040 entitled "System and Method For Dismounted Assured Position, Navigation & Timing (DAPNT)," filed Sep. 24, 2018, which is incorporated herein by reference in its entirety.

BACKGROUND

Field of the Embodiments

The present embodiments are generally directed to systems and methods for ascertaining reliable positional information in the field. More specifically, the present embodiments describe systems and methods for ascertaining reliable positional information in the absence of (or as real-time supplement to) traditional Global positioning system ("GPS") data or more generally, Global Navigation Satellite System (GNSS).

Description of the Related Art

Due to the rise of GPS and other GNSS jamming, GPS denied areas or low signal areas (e.g., due to weather, bad communications links or enemy attack), there is an unmet need in the art for a method for determining accurate position information for assets while on the move. Accurate positional information is crucial for both mounted and dismounted assets. Mounted Assured PNT (Position, Navigation and Timing) (A-PNT) Solution (MAPS) was created to give accurate position in jammed or DIL (Disconnected, Intermittent or Limited bandwidth) environments for on-vehicle applications. The MAPS system uses the last known real GPS location and then uses A-PNT (Assured PNT (Position, Navigation and Timing)) components including, for example, Chip Scale Atomic Clocks (CSAC), Inertial Navigation Units (INU), a GPS or DAGR (either internal or external to the device) and an Inertial Navigation System (INS), to maintain position while on the move in GPS denied and DIL environments. When a GPS signal next becomes available, it is compared to the A-PNT location and the vehicle position is updated if needed. GPS drift is the condition where the positional information that is obtained from the GPS satellites moves over time. The lower the accuracy of the correction source, the more the positional information will move over time. The higher accuracy correction sources are still subject to GPS drift, but to a smaller amount. Exemplary MAPS systems include the VersaPNT provided by Spectracom, an Orolia brand, and the DBH-670 and DBH-672 Digital Beachhead products available from Curtiss-Wright.

In order to provide accurate PNT to dismounted warfighters, a different solution is needed. Dismounted PNT solutions are a primary focus of government-funded research. In 2016, the Army posted a "Request for Information (RFI) for: Assured Positioning, Navigation, and Timing" Solicitation Number: W56KGY-16-R-APNT (hereafter "RFI Solicitation") which solicited industry feedback on the requirements and proposed acquisition strategy for the Assured Positioning, Navigation, and Timing (A-PNT) program. The A-PNT family of solutions includes dismounted solutions, e.g., PNT receiver, with non-GPS augmentation, which distributes PNT to systems on dismounted soldiers as described in the Background of the RFI Solicitation. And in November of 2017 the Army posted a Broad Area Announcement (BAA) for "Positioning, Navigation, and Timing" Solicitation Number: W56KGU-18-R-PN22 (hereafter "BAA Solicitation") that included numerous research interest topics relevant to providing PNT to dismounted soldiers. Both the RFI and BAA Solicitations are incorporated herein by reference.

Prior art solutions and proposed solutions include ground based pseudolites (short for pseudo-satellites) which are towers with repeaters that need to be moved with ground troops and/or providing the dismounted warfighter with additional hardware (e.g., GPS, INU, INS, CSAC and a processing unit) for the Warfighter to wear. The former requires time to move and set up the towers and is not conducive for the on-the-move force. The latter adds more weight to the warfighter and creates the need for smaller, ruggedized A-PNT devices.

Current processor-based node-to-node communication and distance-determination processes are susceptible to processing delays or latency for prioritization and contention throughput. And these delays increase with number of nodes. Accordingly, there is an unmet need in the art to enable, protect and unencumber the dismounted warfighter by adding A-PNT capability without the additional weight of added hardware.

SUMMARY OF THE EMBODIMENTS

In a first exemplary embodiment, a process for determining and updating an individual asset's position when GNSS data is not consistently available to the individual asset, includes: (i) receiving multiple wireless messages at a receiving device located at the individual asset from at least three additional assets in an asset network, wherein each of the multiple wireless messages contains a position for the transmitting additional asset; (ii) determining a distance between the individual asset and each of the at least three additional assets; (iii) determining the individual asset's position using the position for each of the at least three additional assets and the distance between the individual asset and each of the at least three additional assets; and (iv) repeating (i), (ii) and (iii) to update the individual asset's position.

In a second exemplary embodiment, a system for determining a location of the device in a GNSS-limited environment includes: a receiving device for receiving one or more wireless messages transmitted from multiple nodes; a processor pre-programmed with instructions for: accessing current position information from the one or more wireless messages from each of the multiple nodes, determining a distance between the device and each of the multiple nodes, and calculating the location of the device using the current position information for the multiple nodes and determined distance between the device and each of the multiple nodes.

In a third exemplary embodiment, a process for position determination of a first asset when GNSS data is denied or limited, the process includes: receiving, by a receiving device, a wireless message from each of a plurality of additional assets; accessing position information from each of the wireless messages; calculating, using the position information, a distance between the first asset and each of the plurality of additional assets; and calculating the position of the first asset.

BRIEF DESCRIPTION OF THE FIGURES

The following figures are intended to represent exemplary embodiments and should be considered in combination with the detailed description below.

DETAILED DESCRIPTION

As used herein the term asset refers broadly to physical systems (vehicles, vessels, aircraft, weapons, both manned and unmanned) or personnel (e.g., warfighters). The modified term mounted asset is generally recognized in the art as referring to an asset which can be mounted by personnel such as vehicles and other physical systems. Similarly, the term dismounted asset is generally recognized in the art as referring to personnel, e.g., warfighters, who are have dismounted from a vehicle or other physical system. In the descriptions of embodiments herein, mounted assets are considered to have A-PNT capabilities, while dismounted assets do not. Further, though the embodiments refer to dismounted assets as being synonymous with warfighters, the disclosure is not so limited. A dismounted asset could be a drone or other unmanned ground or aerial vehicle (UAV, UGV).

As described further herein, the present embodiments are directed to a solution that extends the A-PNT capability from a ground vehicle (or other asset) through an encrypted Wi-Fi device on the vehicle and uses methods at the receiving dismounted asset (e.g., warfighter) to determine distances from the transmitting source(s) and thus the current location of the receiving asset. Using standard trilateration methods, the dismounted warfighter can determine their exact grid coordinate position. This allows dismounted warfighters to maintain communications and have grid coordinate map location available in a secure method. As the warfighter dismounts from the vehicle, they are able to ascertain accurate PNT information from a mesh network of other A-PNT enabled vehicles thus extending the area of PNT without having to set up, break down, move and reset pseudolites. Certain systems and embodiments avoid the need for additional warfighter-borne hardware. The warfighter hardware that may be used in certain embodiments is a warfighter-borne and Wi-Fi enabled smartphone, tablet, watch or the like with a programmed application for performing the functions described herein. Knowing in real time the locations of dismounted warfighters, as well as other vehicles, reduces fratricide and facilitates mission success. Although the term "warfighter" is used herein in connection with certain examples, the described systems and methods may be used to determine a location of any person or object.

Figure 1B:
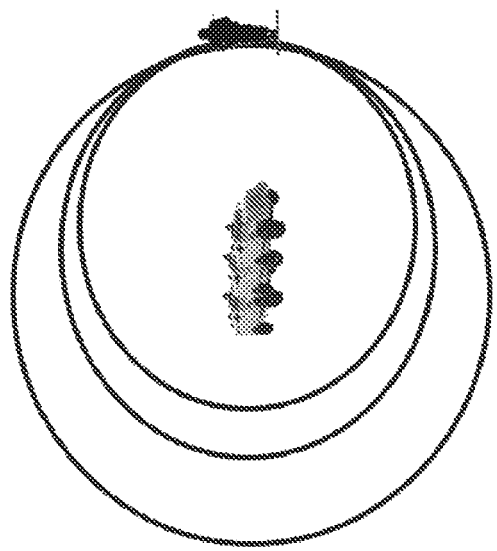
FIGS. 1a and 1b are schematics illustrating how distance to nodes is insufficient to determine warfighter location without node position data.
Figure 1A:
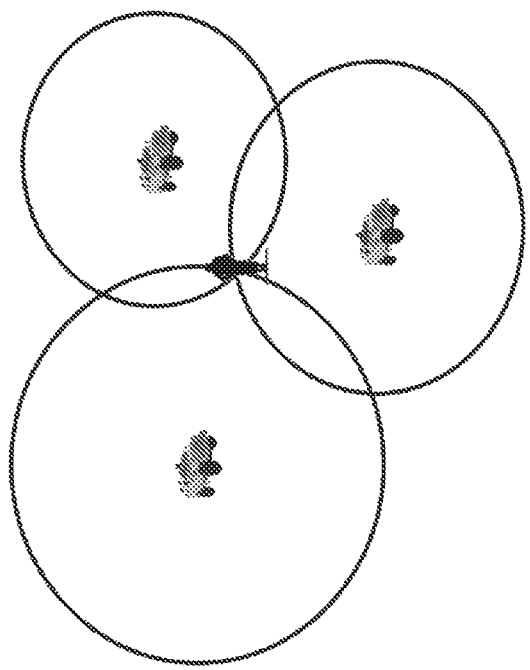

The present embodiments are directed to a dismounted A-PNT (DAPNT) system and methodology that provides the dismounted warfighter with the capability to know their position in GPS denied or DIL environments without excessive equipment and cost. As discussed herein, DAPNT puts the burden of processing and geo-location on the A-PNT enabled vehicles or other locations, via MAPS or other systems, rather than on hardware and software carried by the dismounted warfighter. DAPNT can use known over-the-air (OTA) distance measurement calculations to determine distance to the timing signal sources, but more than known distance is needed. For example, as shown in FIGS. 1a and 1b, both figures show the vehicles at 1000 m, 800 m and 500 m from the warfighter. Both are correct given the distances to the vehicles, but this information alone does not provide assured PNT. On the other hand, if the starting positions of the three vehicles are known in addition to the distance between the warfighter and each of the three vehicles, the location of the warfighter can be determined. However, these calculations become more complicated if the vehicles are in motion. In traditional GPS or cell tower configurations, the positions of the sources (e.g., vehicles) are known, and a simple calculation can be made to determine the warfighter's position relative to the known sources and their geo-coordinates.

In one embodiment, the DAPNT system and method utilizes MAPS technologies and VICTORY (or other common language messaging format) messaging to send a position message to the warfighter that contains the geolocation of the vehicle. The vehicle-borne MAPS unit maintains an accurate map position for the vehicle, even in GPS disrupted environments. VICTORY or Vehicular Integration of C4ISR/EW Interoperability is a Government created optimization architecture which allows the sharing of services to be used by many consuming systems on the vehicle. For instance, a single GPS can be utilized by many systems that require GPS so that these systems do not need to bring their own GPS, thus reducing the Size, Weight and Power ("SWaP") for the platform.

In one embodiment, the mounted vehicle contains an Assured-Position, Navigation & Timing (A-PNT) device (MAPS) that is VICTORY enabled. The A-PNT device is preferably protected inside an armored vehicle. The vehicle's power pack delivers sufficient energy thereto and can enable long-range communications (in one example, Wi-Fi) to the dismounted warfighter. Examples of various MAPS-like systems that may be considered by one skilled in the art for use with the present embodiments are described in U.S. Pat. Nos. 6,671,622, 7,409,290, U.S. Patent Publication 2015/0276783, and Chinese Patent No. 104931993, the contents of which are incorporated herein by reference in their entireties. In addition, or alternatively, the VersaPNT provided by Spectracom, an Orolia brand, and the DBH-670 and DBH-672 Digital Beachhead products available from Curtiss-Wright may be used in accordance with the disclosed embodiments.

Various types of communications technologies may be used in connection with the disclosed embodiments. By way of example only, commercially available Wi-Fi ranges are in the 800-1000 m range (e.g., telephonics IAIU NSA type 1 encrypted). In one example, a mile long range (1600 m) antenna may be used. One skilled in the art will understand that with an increase in available power, the Wi-Fi communications range may be increased. In operation, the vehicle's INS takes the A-PNT MAPS vehicle position data and checks it against the GPS/DAGR vehicle position data (when available) to make any corrections. In GPS denied (jammed, low or no GPS signal) areas as well as DIL (Disconnected, Intermittent or Limited bandwidth) environments, the A-PNT MAPS vehicle position data is the primary position source with the GPS/DAGR as the secondary source. The INS is set to intervals that can be almost real time. In a GPS DIL environment, whenever GPS is detected by the vehicle's INS, it is compared to the most recent A-PNT MAPS vehicle position data, but the A-PNT MAPS vehicle position data is the primary position device in the GPS DIL environment.

The A-PNT MAPS vehicle position data is sent to the dismounted warfighter via a secure OTA (Over-The-Air) transport (radio or non-radio) in a VICTORY message, where it is received and read by a DAPNT software application (App) running on the warfighter's receiving device to ascertain the exact location(s) of the vehicle(s) and the distance to those vehicle(s). The DAPNT App is also equipped with programming and hardware (as the case may be) for determining distance between the warfighter and the vehicle using one or more known methodologies for determining distances between wireless nodes. For example, using time-of-arrival (TOA) calculations, the time difference between sending a data packet from a first to a second node and receiving the immediate acknowledgement from the second node would provide a distance measurement. This process is described in A. Gunther, et al, Measuring Round Trip Times to Determine the Distance between WLAN Nodes, In Proc. of Networking 2005, Waterloo, Canada, May 2005, which is incorporated herein by reference. In one embodiment, the Warfighter's processor, e.g., smart device with DAPNT App, receives a vehicle position message with a time stamp indicating time sent from the vehicle and then compares with the time the message was received at the DAPNT App to determine distance to the vehicle.

One skilled in the art recognizes that alternative methodologies for determining distance may be used, such as Received Signal Strength Indication (RSSI). The RSSI process is described in F. Viani, et al., Object Tracking Through RSSI Measurements in Wireless Sensor Networks, Technical Report #DISI-11-005, University of Trento Dipartimento Di Ingegneria E Scienza Dell'informazione, May 2008 which is incorporated herein by reference. And a third exemplary method for measuring distance between two nodes could also be implemented, wherein pulse repeaters at the vehicles and the warfighter endlessly repeat a pulse generating a measurable frequency that varies inversely with the distance to be measured as described by Sergio Elias Hernandez et al., Distance and Cable Length Measurement System, MDPI Sensor Journal, October 2009, incorporated herein by reference.

If distance measurements from the dismounted warfighter to three or more known-location nodes are available, then a location of the dismounted warfighter could be determined by the DAPNT App using trilateration techniques. As the warfighter moves in and out of the range of various A-PNT-enabled MAPS vehicles (or other nodes), the mesh network of nodes maintains connectivity and constantly updates the DAPNT App to give the warfighter their most current location. When GPS (GNSS) is restored, the DAPNT app checks the GPS location from the dismounted warfighter's GPS device against the current DAPNT App generated location as determined using the received A-PNT MAPS vehicle (or node) position data and synchronizes the data accordingly to update the warfighter's position with the most accurate data.

Utilizing the A-PNT MAPS vehicle (or node) position data delivered via VICTORY messaging as the warfighter's DAPNT position source alleviates the need for the warfighter's navigation system to switch GPS message sources between DAPNT and GPS as they can work concurrently. This allows the dismounted warfighter's DAPNT App to check both GPS and VICTORY position messages simultaneously. With the warfighter's DAPNT as the primary source for position (utilizing VICTORY messages and distance from vehicles) and actual GPS as a secondary source, the DAPNT App can continually check the DAPNT location against the actual GPS location when and if it is available.

The accurate grid coordinate position of the dismounted Warfighter may be determined using trilateration, which is the method employed today for locating one's position via GPS. When GPS data (or other GNSS) is available, GPS receivers use trilateration (a more complex version of triangulation) to determine its position on the surface of the earth by timing signals from a minimum of three GPS satellites. The GPS determines absolute or relative locations of points by measurement of distances, using the geometry of circles, spheres or triangles. As the name suggests it uses at least three time sources to find the position of an object. For GPS, the time sources are the 31 geodesic satellites in orbit around the globe that provide GPS information. For cell phones, it is the cell phone towers. The process is the same regardless of the origin of the signal.

Figure 2C:
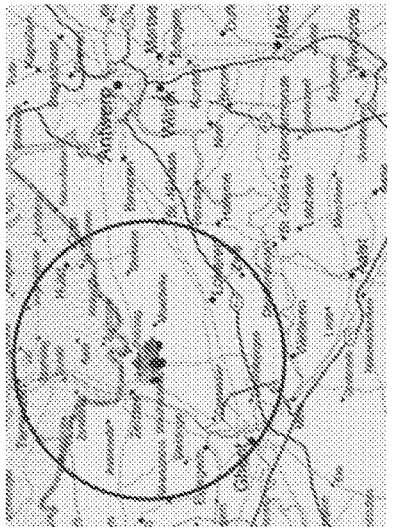
FIGS. 2a, 2b, and 2c are schematics illustrating how at least three sets of distance and position data are required to determined warfighter location.
Figure 2B:
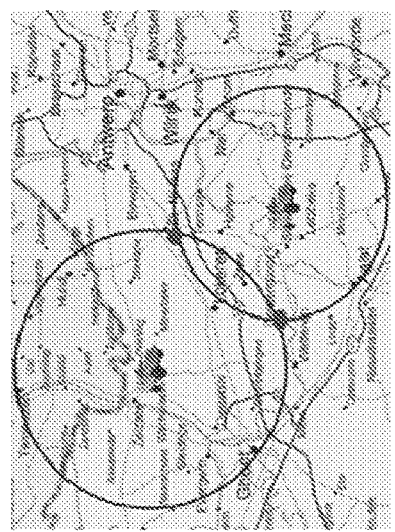
Figure 2A:

Referring to FIG. 2a, with a single timing signal, the warfighter can be anywhere on the perimeter of the circle formed by the known distance from the source. Accordingly, this single datapoint is not sufficient to determine warfighter location. Referring to FIG. 2b, using two timing signals with known distances we see that the circles overlap, and the position may be one of two places on the converging circles. Again, the information in FIG. 2b is not sufficient for an accurate position determination. Finally, adding a third timing signal, we are able to find the single spot where all three circles converge to form the point where we find the location of the dismounted warfighter (FIG. 2c). And accuracy greatly improves as the number of received signals increases beyond the required three. More sampling iterations results in a higher degree of accuracy, which becomes important for On-The-Move (OTM) situations, i.e., situations in which the warfighter is physically moving.

In one embodiment, the VICTORY message(s) containing each node's A-PNT vehicle position information are contained in the payload of a secure OTA data packet utilizing, e.g., the IEEE 802.11ac wireless networking standard in the 802.11 family developed in the IEEE Standards Association, which provides high-throughput wireless local area networks (WLANs) on the 5 GHz band. The standard was developed from 2008 (PAR approved Sep. 26, 2008) through 2013 and published in December 2013 and is incorporated herein by reference. The specification has multi-station throughput of at least 1 gigabit per second and single-link throughput of at least 500 megabits per second (500 Mbit/s). This is accomplished by extending the air-interface concepts embraced by 802.11n: wider RF bandwidth (up to 160 MHz), more Multi-user, Multiple-Input, Multiple-Output (MU-MIMO) spatial streams, downlink multi-user MIMO, and high-density modulation (up to 256-QAM). Cisco's Technical White Paper entitled "802.11ac: The Fifth Generation of Wi-Fi" is incorporated herein by referenced for its teachings.

MU-MIMO technology allows a router to communicate with multiple devices simultaneously. This decreases the time each device has to wait for a signal and dramatically speeds up the network. MU-MIMO allows one 802.11ac device to transmit individual data streams to multiple different clients at the same time. This removes multiple nodes on the same data streams. The 802.11ac standard is a chip based solution that removes the latency that an operating system based solution may induce. Under older 802.11 protocols (e.g., 802.11b, g and n), users are served on a first come, first serve basis. MU-MIMO was created to support environments where multiple users are trying to access the wireless network at the same time. When multiple users begin accessing the router at or near the same time, congestion can be introduced as the router services the first user's request while the second (and third, fourth, etc.) wait. While these times can be miniscule, it can add up with more devices (smartphones, tablets, computers, etc.) and users asking for resources. MU-MIMO helps this by allowing for multiple users to access router functions without the congestion. Compared to single user MIMO and earlier wi-fi protocols, MU-MIMO has more spatial streams, i.e., the amount of signals that can be transmitted simultaneously from one device using different antennas; larger bandwidth channels, i.e., the rate at which data passes between two devices; capacity, i.e., more bandwidth available and better distribution mean—instead of 30 to 40 clients (nodes) the system can support 80 to 100; range, i.e., placed at the same distance 802.11ac devices will have increased data or connection rates; and speed, i.e., increased bandwidth capabilities starting at up to three times more. In the present embodiments, the A-PNT MAPS hardware may be equipped with an 802.11ac device operable in a MU-MIMO configuration. This facilitates transmission of A-PNT MAPS vehicle (or node) position data via VICTORY messaging from a single vehicle to multiple warfighters simultaneously.

Figure 3:
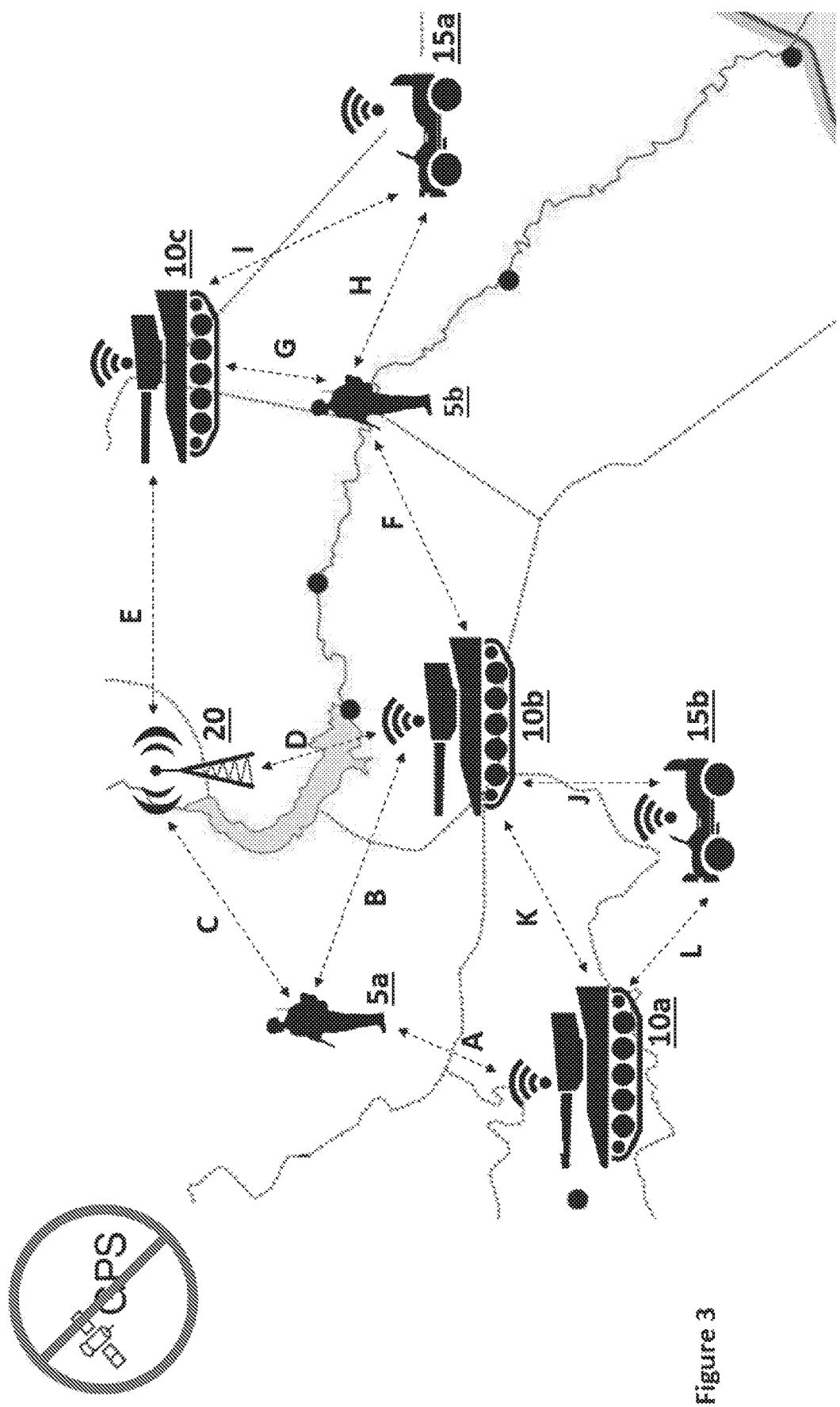
FIG. 3 is a schematic showing an exemplary field situation with multiple nodes and assets.

Referring to FIG. 3, an exemplary field situation is shown, wherein GPS signals are not available to on-the-ground assets, including dismounted warfighters 5a and 5b, tanks 10a, 10b, 10c, ground vehicles 15a, 15b or tower 20. In the absence of available GPS data, tanks 10a, 10b, 10c, and ground vehicles 15a, 15b are equipped with A-PNT MAPS technology and tower 20 has a fixed, i.e., known position. These assets form a mesh network. Dismounted warfighters 5a and 5b having at least one smart appliance (e.g., phone, tablet, watch) equipped with a DAPNT App and being in communicative Wi-Fi proximity to at least three transmitting assets within the mesh network, can ascertain necessary data to establish warfighter position. Further, all transmitting assets within Wi-Fi proximity of one another can exchange data relevant to PNT in order to stay as up-to-date as possible. The numerous point-to-point connections across the asset mesh are shown as A-L. In accordance with the process described herein, dismounted warfighter 5a can ascertain location using at least mesh connections A, B, and C. And dismounted warfighter 5b can ascertain location using at least mesh connections F, G, and H. It should be appreciated by those skilled in the relevant art that the number, location and types of assets represented in FIG. 3 are intended to be merely exemplary. Further, although FIG. 3 suggests that all of the assets in the mesh are GPS-denied, this may not be the case. Some assets in the mesh might never be GPS-denied or may intermittently receive GPS data while the dismounted warfighter remains constantly GPS-denied.

Figure 4:
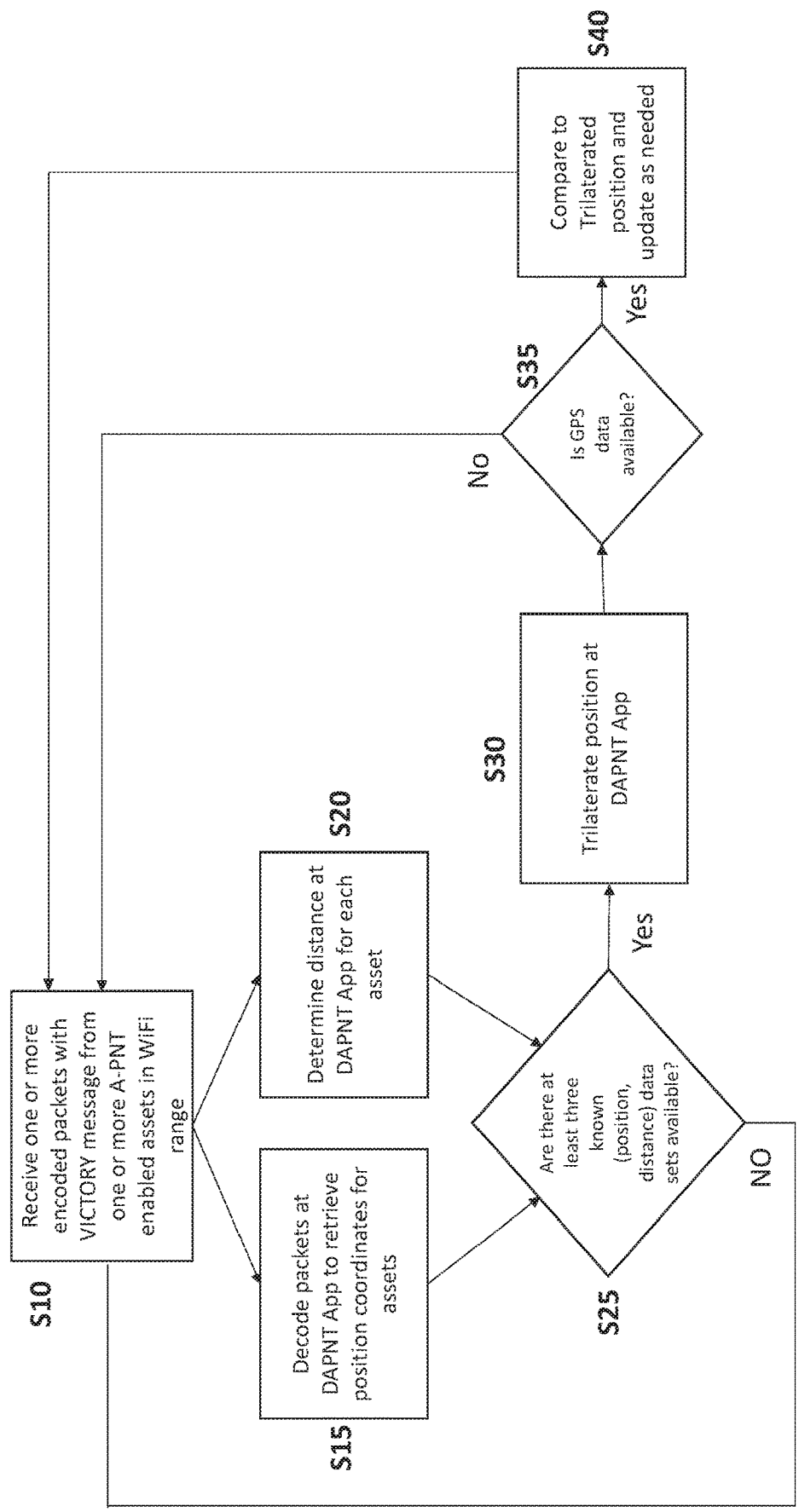
FIG. 4 is a flowchart of an exemplary process for determining dismounted asset location in accordance with an embodiment described herein.

FIG. 4 provides an exemplary process flow in accordance with one embodiment. With reference to dismounted Warfighter 5a from FIG. 3, dismounted Warfighter 5a as well as all other grounded assets are in a GPS-denied environment. Assets 10a, 10b are equipped with A-PNT MAPS technology and are able to ascertain position information without current GPS data, while transceiver tower 20 has a known position. Accordingly, assets 10a, 10b and 20 within Wi-Fi range of dismounted Warfighter 5a transmit VICTORY messages in encoded data packets using e.g., 802.11ac format, which are received by dismounted Warfighter 5a (S10). The dismounted Warfighter's DAPNT App decodes received data packets to obtain VICTORY message data, including node position coordinates for the transmitting asset S15. Simultaneously or shortly thereafter, the DAPNT App determines distance to the transmitting asset use one or more of the methods described herein S20. Once the DAPNT App determines that there are at least three available (position, distance) data sets S25, the DAPNT App is able to use trilateration to determine the receiving dismounted warfighter's current position coordinates S30. When/if GPS data becomes available to the Warfighter, GPS-calculated position coordinates are compared to the A-PNT MAPS generated Warfighter position coordinates S35 to confirm and/or update as is appropriate S40. Note that the position coordinates for the transceiver tower 20 could be previously known and stored in a database associated with the DAPNT App (or readily accessible thereby) or the transceiver tower 20 could be also be A-PNT enabled movable asset which calculates and transmits its position coordinates in VICTORY messages as discussed above. Further, one skilled in the art recognizes that as GPS data becomes available to assets within Wi-Fi range of the dismounted Warfighter 5a, the position coordinates in the VICTORY messages transmitted by those assets will be updated accordingly.

Similarly, it should be understood that the functions of the DAPNT App can be selectively set to operate in different modes in accordance with the Warfighter's location-determination requirements, as well as remaining power considerations. That is, the DAPNT App could be set to continuously update a Warfighter's position in accordance with the processes described herein and either provide continual display thereof on a display screen of the Warfighter's smart appliance (e.g., phone, tablet, watch). Alternatively, the DAPNT App could be set to wait for a request from the Warfighter before receiving wireless messages and calculating and displaying the Warfighter's position. It will also be appreciated that the DAPNT App could include map overlay capability, wherein the calculated Warfighter position is displayed on a map so as to orient the Warfighter with respect to underlying terrain, as well as the locations of other assets (nodes).

One skilled in the art will appreciate the variations and additions to the present embodiments which are well within the scope thereof, regardless of explicit inclusion in this document. For example, while some embodiments describe a Wi-Fi communications network for transmission between assets under the 802.11 standard, other protocols and standards are contemplated. For example, Dedicated Short-Range Communication (DSRC) enables vehicular communication using periodic broadcast messages. DSRC is a two-way short-to-medium-range wireless communications capability that permits very high data transmission critical in communications-based active safety applications. In Report and Order FCC-03-324, the Federal Communications Commission (FCC) allocated 75 MHz of spectrum in the 5.9 GHz band for use by Intelligent Transportations Systems (ITS) vehicle safety and mobility applications. Currently the subject of research in the area of vehicular collision avoidance, the DSRC could be of use as the primary or possibly a supplemental communications standard with the present embodiments.

The invention claimed is:

1. A process for determining and updating an individual asset's position when GNSS data is not consistently available to the individual asset, the process comprising:
   (i) receiving multiple wireless messages at a receiving device located at the individual asset from at least three additional assets in an asset network, wherein each of the multiple wireless messages contains a position for the transmitting additional asset;

(ii) determining a distance between the individual asset and each of the at least three additional assets;

(iii) determining the individual asset's position using the position for each of the at least three additional assets and the distance between the individual asset and each of the at least three additional assets; and (iv) repeating (i), (ii) and (iii) to update the individual asset's position.

2. The process according to claim 1, wherein the wireless messages are encrypted and further wherein the receiving device implements pre-programmed instructions on a processor to decrypt each of the encrypted wireless messages.

3. The process according to claim 1, further comprising: receiving GNSS location data at a GNSS-receiver associated with the receiving device at the individual asset, comparing the GNSS location data to the determined individual asset's position, and updating current individual asset position in accordance with the received GNSS location data.

4. The process according to claim 1, wherein at least one of the individual asset and the at least three additional assets is moving, and further wherein each of the at least three additional assets is capable of updating their position independent of GNSS data access.

5. The process according to claim 1, wherein at least one of the at least three additional assets is stationary.

6. The process according to claim 1, wherein determining a distance between the individual asset and each of the at least three additional assets includes reading a transmitted time stamp associated with each of the received multiple wireless messages and calculating the distance using the transmitted time stamp and a time of receipt for each of the received messages.

7. The process according to claim 1, wherein determining the individual asset's position includes using a trilateration process.

8. The process according to claim 2, wherein the encrypted wireless messages are transmitted and received across a distance of up to 1000 meters.

9. The process according to claim 2, wherein the encrypted wireless messages are transmitted in accordance with an 802.11ac standard.

10. A system for determining a location of the device in a GNSS-limited environment comprising:
 a receiving device for receiving one or more wireless messages transmitted from multiple nodes;
 a processor pre-programmed with instructions for:
  accessing current position information from the one or more wireless messages from each of the multiple nodes,
  determining a distance between the device and each of the multiple nodes, and
  calculating the location of the device using the current position information for the multiple nodes and determined distance between the device and each of the multiple nodes.

11. The system according to claim 10, wherein the one or more wireless messages are encrypted and further wherein the processor decrypts each of the encrypted messages.

12. The system according to claim 10, wherein the predetermined communications range is Wi-Fi.

13. The system according to claim 10, wherein the receiving device includes a GNSS receiver for receiving GNSS signals when the GNSS signals are available.

14. The system according to claim 11, wherein the one or more encrypted wireless messages are formatted in accordance with an 802.11ac standard.

15. The system according to claim 10, wherein determining a distance between the device and each of the multiple nodes includes reading a transmitted time stamp associated with each of the received multiple wireless messages and calculating the distance using the transmitted time stamp and a time of receipt for each of the received messages.

16. The system according to claim 12, wherein the receiver includes the processor.

17. A process for position determination of a first asset when GNSS data is denied or limited, the process comprising:
 receiving, by a receiving device, a wireless message from each of a plurality of additional assets;
 accessing position information from each of the wireless messages;
 calculating, using the position information, a distance between the first asset and each of the plurality of additional assets; and
 calculating the position of the first asset.

18. The process according to claim 17, wherein the wireless messages are encrypted.

19. The process according to claim 17, wherein the plurality of additional assets includes at least one moving asset.

20. The process according to claim 17, wherein calculating a distance between the asset and each of the plurality of additional assets includes reading a transmitted time stamp associated with each of the received wireless messages and calculating the distance using the transmitted time stamp and a time of receipt for each of the received messages.

21. The process according to claim 20, wherein the first asset determines its position using a trilateration process.

* * * * *